United States Patent
Yeh

(10) Patent No.: US 10,718,967 B2
(45) Date of Patent: Jul. 21, 2020

(54) CAPACITIVE TOUCH DISPLAY PANEL

(71) Applicant: HannStar Display Corporation, Taipei (TW)

(72) Inventor: Cheng-Yen Yeh, Taichung (TW)

(73) Assignee: HannStar Display Corporation, Taipei (TW)

( * ) Notice: Subject to any disclaimer, the term of this patent is extended or adjusted under 35 U.S.C. 154(b) by 197 days.

(21) Appl. No.: 15/499,925

(22) Filed: Apr. 28, 2017

(65) Prior Publication Data

US 2017/0315395 A1   Nov. 2, 2017

(30) Foreign Application Priority Data

Apr. 29, 2016   (CN) .......................... 2016 1 0279444

(51) Int. Cl.
    *G02F 1/1333*   (2006.01)
    *G02F 1/1368*   (2006.01)
    *G06F 3/041*    (2006.01)
    *G06F 3/044*    (2006.01)

(52) U.S. Cl.
    CPC .......... *G02F 1/13338* (2013.01); *G06F 3/044* (2013.01); *G06F 3/0412* (2013.01)

(58) Field of Classification Search
    CPC ..... G02F 1/13338; G02F 2001/134372; G06F 3/0412; G06F 3/044
    See application file for complete search history.

(56) References Cited

U.S. PATENT DOCUMENTS

| 2014/0184559 A1* | 7/2014 | Han | G06F 3/044 345/174 |
| 2016/0349889 A1* | 12/2016 | Yang | G02F 1/13338 |

FOREIGN PATENT DOCUMENTS

| CN | 103489871 A | 1/2014 |
| CN | 103902120 A | 7/2014 |
| CN | 105206568 A | 12/2015 |
| JP | 2012108168 A | 6/2012 |

* cited by examiner

*Primary Examiner* — Phu Vu
(74) *Attorney, Agent, or Firm* — CKC & Partners Co., LLC

(57) ABSTRACT

A capacitive touch display panel includes sensing electrode columns and sensing electrode signal wire groups. Each of the sensing electrode columns includes sensing electrodes. The sensing electrode signal wire groups are electrically connected to the sensing electrode columns, in which each of the sensing electrode signal wire groups consists of at least one first sub-signal wire group and at least one second sub-signal wire group, in which the first sub-signal wire group includes N sensing electrode signal wires, and the second sub-signal wire group includes N+1 sensing electrode signal wires, N is a positive integer. Consequently, the capacitive touch display panel of the present invention can improve the active load balance and the optical characteristics of the capacitive touch display panel.

20 Claims, 16 Drawing Sheets

US 10,718,967 B2

CAPACITIVE TOUCH DISPLAY PANEL

RELATED APPLICATIONS

This application claims priority to China application No. 201610979444.2, filed Apr. 29, 2016, which is herein incorporated by reference.

BACKGROUND

Field of Invention

The present invention relates toe capacitive touch display panel. More particularly, the present invention relates to an in-cell capacitive touch display panel.

Description of Related Art

In recent years, due to the rapid development of liquid crystal display (LCD) technology, LCDs are generally used in various electronic devices, such as smart phones. In order to provide a convenient input interface, touch sensing technologies are generally used in the LCDs to provide touch sensing function and thus users can input information by pressing or touching the LCDs.

Aforementioned touch sensing technologies include add-on touch sensing technology, on-cell touch sensing technology, and in-cell touch sensing technology, in which the in-cell touch sensing technology becomes increasingly popular since a LCD using the in-cell touch sensing technology has a thinner thickness and higher durability.

However, a phenomenon of a strip pattern occurs on a screen of the LCD when the LCD uses current in-cell touch sensing technology, and results in poor image quality. Therefore, a touch display panel is needed to improve the aforementioned disadvantage.

SUMMARY

An object of the present invention is to provide a capacitive touch display panel having a balanced layout of sensing electrode signal wires, thereby overcoming the disadvantage of the strip pattern generated by the LCDs.

An embodiment of the present invention provides a capacitive touch display panel which includes plural sensing electrode signal wire groups. The sensing electrode signal wire groups are electrically connected to the sensing electrode columns, in which each of the sensing electrode signal groups consists of at least one first sub-signal wire group and at least one second sub-signal wire group. The first sub-signal wire group includes N sensing electrode signal wires, the second sub-signal wire group includes N+1 sensing electrode signal wires, N is a positive integer.

From the above description, the embodiments of the present invention include the signal wire groups having different numbers of the signal wires, and by averagely distributing these signal wire groups to improve, such that the whole load of the signal wires of the active region and the optical characteristics (such as aperture ratio) of the capacitive touch display panel achieve uniform.

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings.

DETAILED DESCRIPTION

Figure 1:
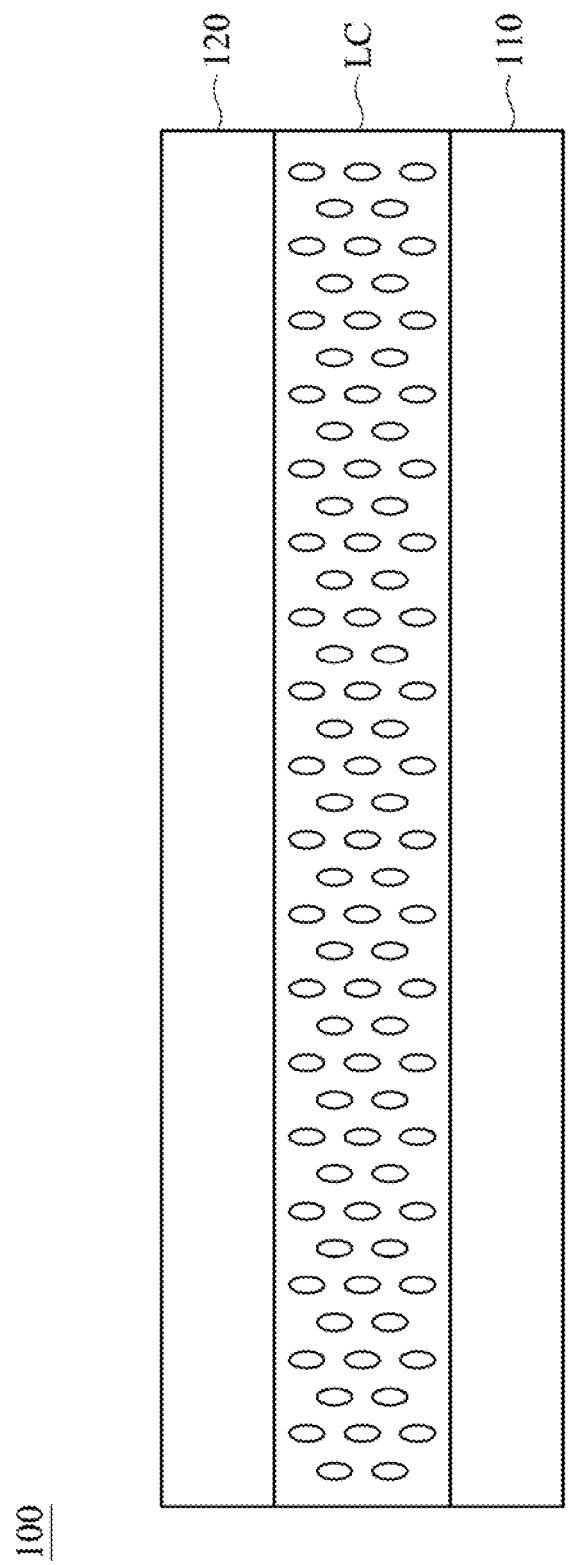
FIG. 1 is a schematic diagram showing a structure of a capacitive touch display panel according to an embodiment of the present invention.

Referring to FIG. 1, FIG. 1 is a schematic diagram showing a structure of a capacitive touch display panel 100 according to an embodiment of the present invention. The capacitive touch display panel 100 includes a thin film transistor array substrate 110, a color filter substrate 120, and a display medium layer, such as a liquid crystal layer LC or a bi-stable electrophoretic display material layer, located between the thin film transistor array substrate 110 and the color filter substrate 120. In this embodiment, the thin film transistor array substrate 110 includes a substrate and a transistor array formed on the substrate, and the color filter substrate 120 includes another substrate, a color filter layer formed on the substrate, and a light-shielding layer formed on the substrate. However, embodiments of the present invention are not limited thereto. In other embodiments of the present invention, the color filter layer of the capacitive touch display panel 100 may be formed on the thin film transistor array substrate 110, and the color filter substrate 120 is replaced by a transparent substrate having no color filter layer.

Figure 2:
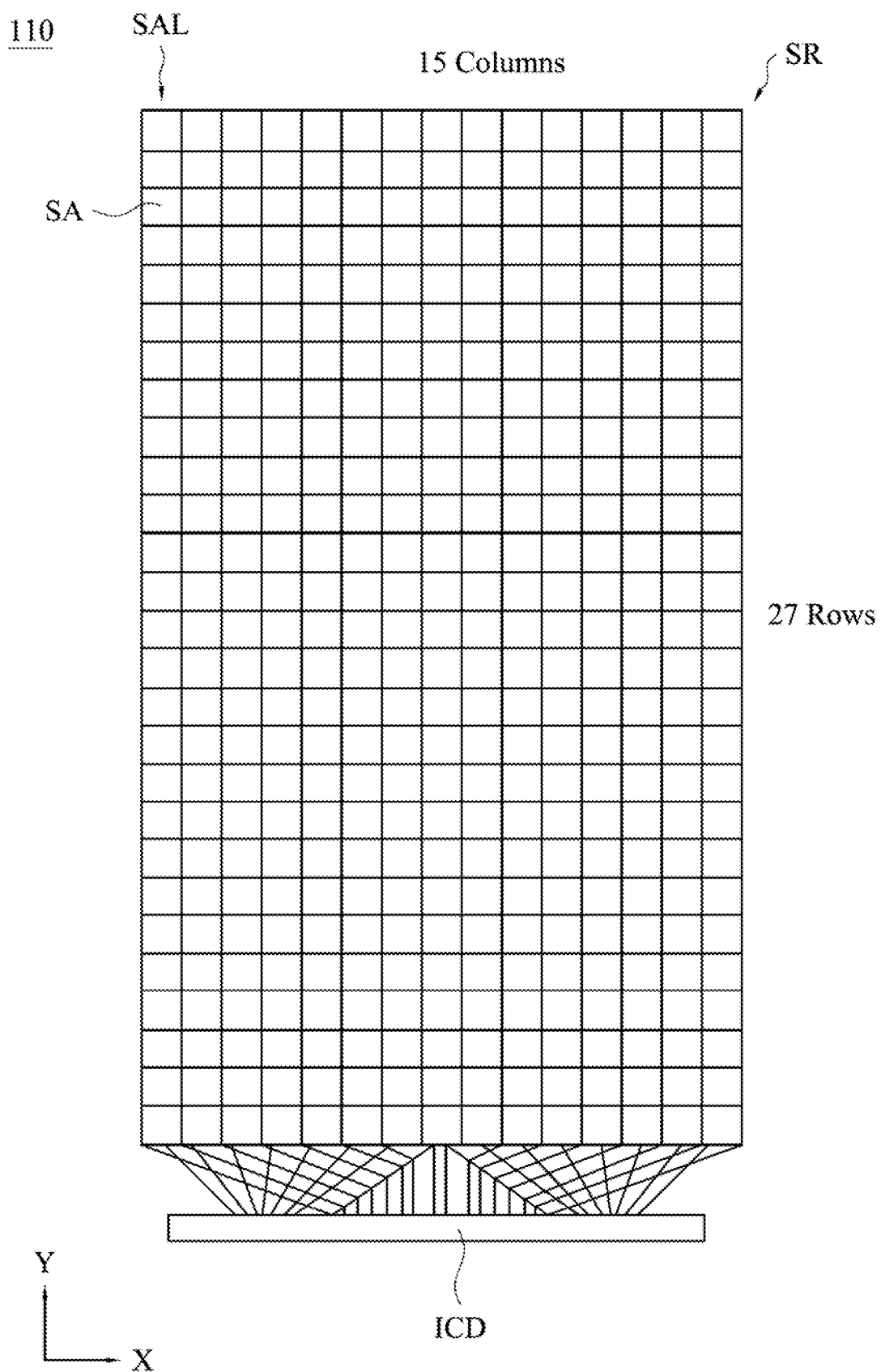
FIG. 2 is a schematic diagram showing a structure of a thin film transistor array substrate of a capacitive touch display panel according to an embodiment of the present invention.

Referring to FIG. 2, FIG. 2 is a schematic diagram showing a structure of a thin film transistor array substrate 110 of a capacitive touch display panel 100 according to an embodiment of the present invention. The thin film transistor array substrate 110 includes a sensing region SR and is electrically connected to a touch sensing circuit ICD. The sensing region SR is used to sense a touch operation of a user to generate the touch sensing signals accordingly, and the touch sensing circuit ICD is used to receive and process these touch sensing signals. The capacitive touch display panel 100 of the present invention is, for example, a touch display panel using self capacitance touch technology. The touch sensing circuit ICD can provide a driving signal of the sensing region SR and receive a feedback touch sensing signal, thereby locating the touch position of the user. The sensing region SR includes plural sensing electrodes SA to senses the touch operation of the user. These sensing electrodes SA have two functions. Regarding a first function of the functions, the sensing electrodes SA are used as a common electrode layer of the thin film transistor array substrate 110 to provide a common voltage level to the pixels of the display device. Regarding a second function of the functions, the sensing electrodes SA are used as a touch sensing layer responsible for a touch sensing function. For example, a common electrode layer having a larger area is divided into plural patterned common electrode layers each of which has a smaller area and is used as the sensing electrode SA. The sensing electrodes SA form a sensing array, and the sensing array includes plural sensing electrode columns SAL. The sensing electrode columns SAL are electrically connected to plural sensing electrode signal wire groups LG. For example, one sensing electrode column SAL is electrically connected to one sensing electrode signal wire group LG, thereby electrically connecting the touch sensing circuit ICD to the sensing region SR through the sensing electrode signal wire groups LG. In this embodiment, the sensing array includes 15×27 sensing electrodes SA. In other words, the sensing array includes 15 sensing electrode columns SAL and 27 sensing electrode rows, but embodiments of the present invention are not limited thereto. In addition, the touch sensing circuit ICD of the present invention can be a touch display drive IC (TDDI). That is, the touch sensing circuit ICD of the present invention can be integrated with a LCD driver circuit to be an integrated circuit component. The TDDI has plural channels, and these channels are electrically connected to the sensing electrode signal wire group, thereby receiving the touch sensing signals.

Figure 3:
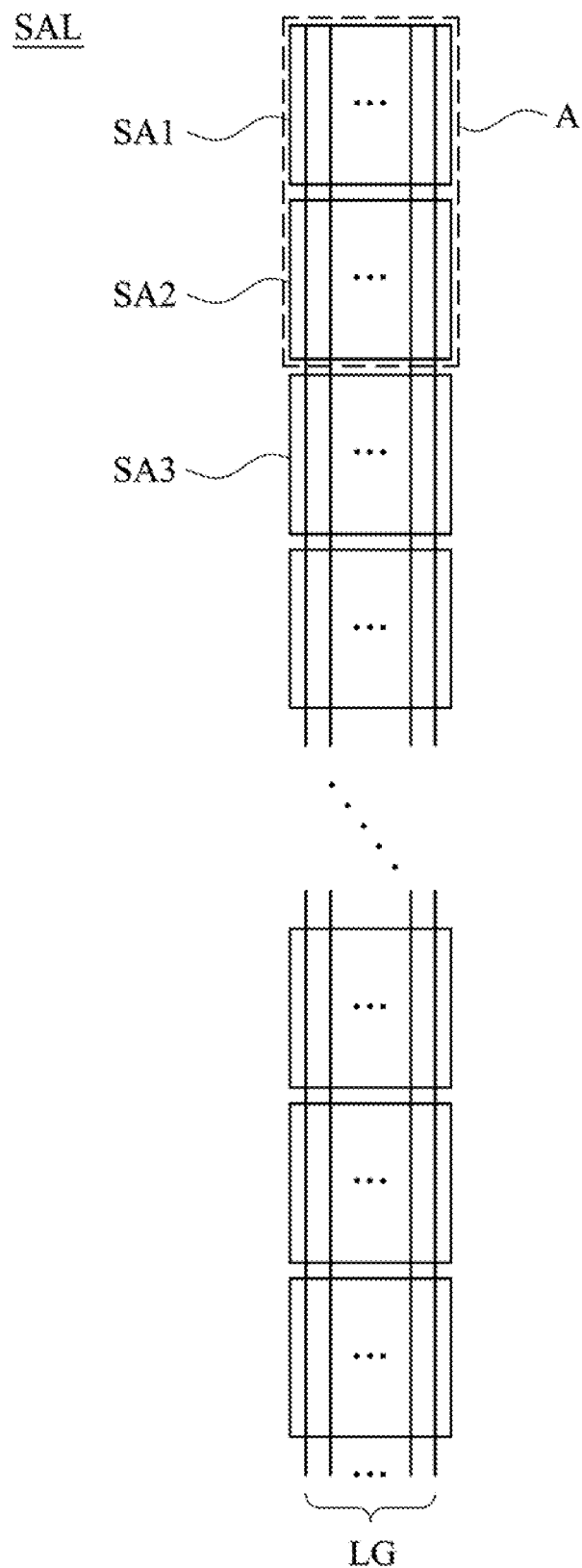
FIG. 3 is a schematic diagram showing the sensing electrode columns and a corresponding sensing electrode signal wire group according to an embodiment of the present invention.

Referring to FIG. 2 and FIG. 3, FIG. 3 is a schematic diagram showing the sensing electrode columns SAL and a corresponding sensing electrode signal wire group LG according to an embodiment of the present invention. The sensing array of the capacitive touch display panel 100 of FIG. 2 includes 15 sensing electrode columns SAL and 27 sensing electrode rows. That is, each of the sensing electrode columns SAL includes 27 sensing electrodes SA. If the resolution of the display region of the capacitive touch display panel 100 is 720×1280, the number of sub-pixels PX along an X-direction is 720×3=2160. Since there are 15 sensing electrode columns SAL along the X-direction, each of the sensing electrode columns SAL covers 2160/15=144 sub-pixels PX along the X-direction. Similarly, each of the sensing electrodes SA covers 47 sub-pixels PX along a Y-direction. That is, each of the sensing electrodes SA covers about 144×47 sub-pixels PX. Since the sensing electrode signal wire L extends along the Y-direction to be connected to the touch sensing circuit ICD, the sensing electrode signal wire L is arranged within a shade area (black matrix) between two adjacent sub-pixels PX to avoid decrease of an aperture ratio of the sub-pixels PX. However, embodiments of the present invention are not limited thereto. In other words, with respect to each of the sensing electrode columns SAL, there are 144 sensing electrode signal wires L passing through one sensing electrode column SAL. That is, the region of each of the sensing electrodes SA covers 144 sensing electrode signal wires L. In this embodiment, a sensing electrode column SAL covering 144 sensing electrode signal wires L is an example used for illustration only. Actually, there are different numbers of the sensing electrode signal wires L due to the resolution of the display region of the capacitive touch display panel 100, or due to different dimension of the capacitive touch display panel 100, or due to different size of a sensing electrode SA.

If the number of the sensing electrode signal wires L arranged along the X-direction corresponding to each of the sensing electrode columns SAL is not 144, and instead only 27 sensing electrode signal wires L are arranged to be connected to the 27 correspondingly sensing electrodes SA along the X-direction, a portion of sub-pixels PX in a region which the sensing electrode signal wires L pass through is affected by the sensing electrode signal wires L, but a portion of sub-pixels PX in a region which the sensing electrode signal wires L do not pass through is not affected by the sensing electrode signal wires L, such that the loads of the sub-pixels PX of the different regions are different from each other and the non-uniform display of the sub-pixels PX are raised accordingly result in the phenomenon of the different level of strip patterns on the screen.

Figure 4A:
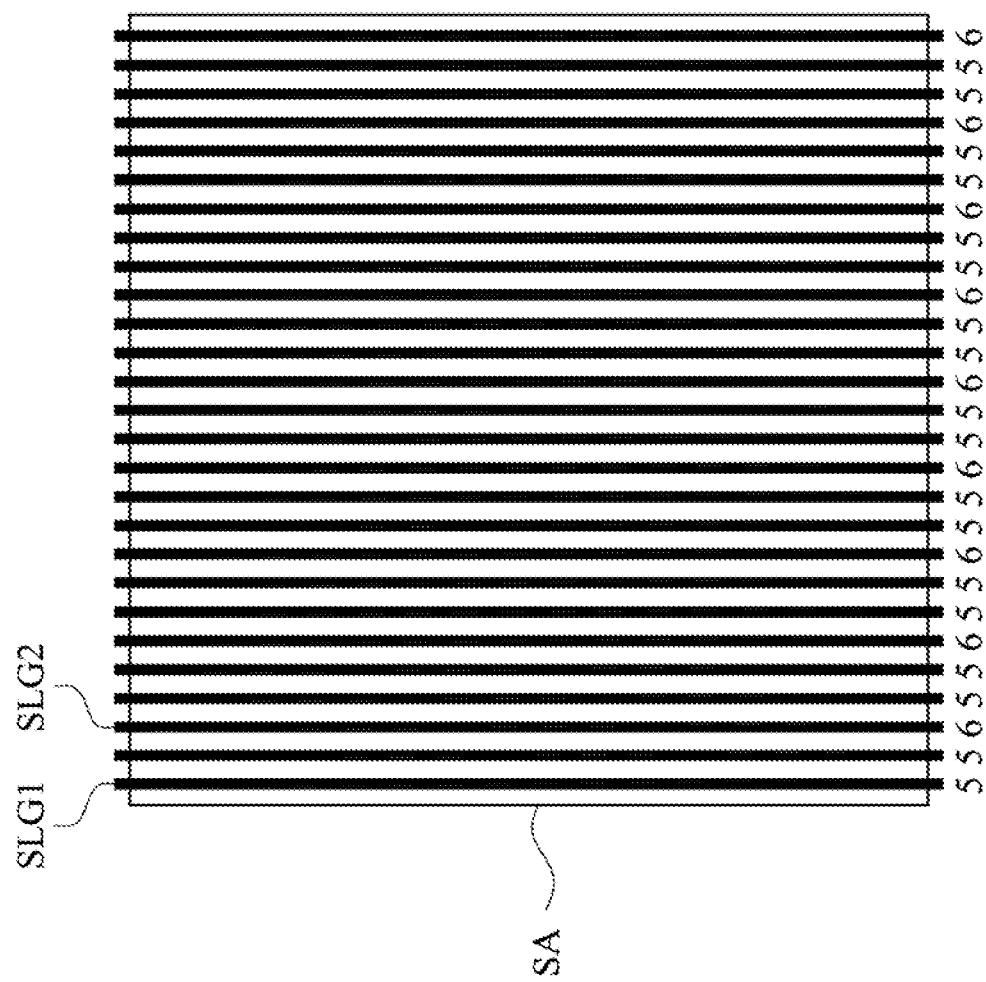
FIG. 4*a* and FIG. 4*b* are schematic diagrams showing sub-signal wire groups of the sensing electrode signal wire group.
Figure 5A:
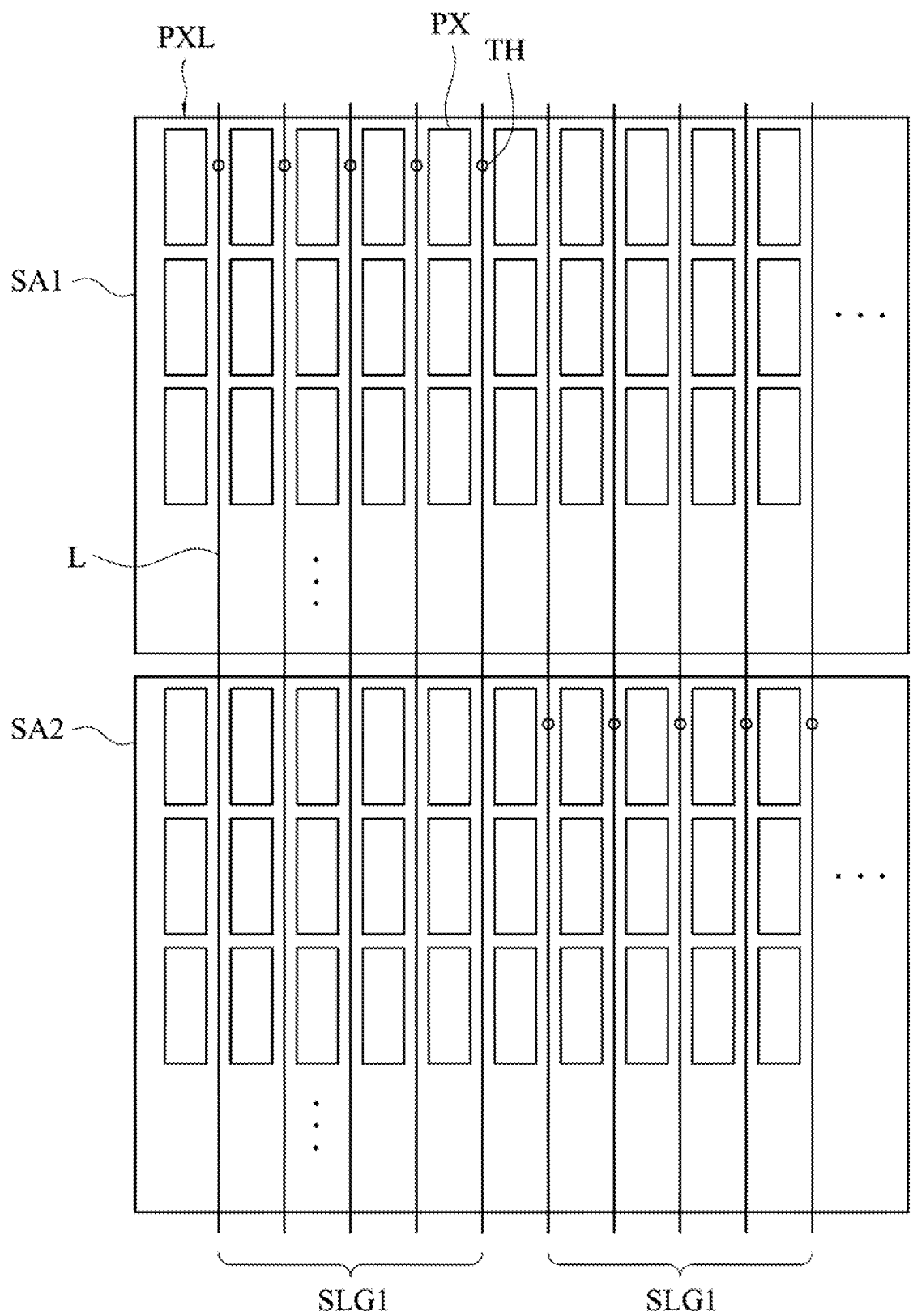
FIG. 5*a* and FIG. 5*b* are enlarged schematic diagrams according to the region A of FIG. 3.

Referring to FIG. 3, FIG. 4a, and FIG. 5a, FIG. 4a is a schematic diagram showing sub-signal wire groups of the sensing electrode signal wire group LG, and FIG. 5a is an enlarged schematic diagram showing the region A of FIG. 3. As shown in FIG. 3, a sensing electrode signal wire group LG (such as aforementioned 144 sensing electrode signal wires L) is correspondingly arranged in a region covered by a sensing electrode column SAL, and electrically connected to each of the sensing electrodes SA of the sensing electrode columns SAL. As shown in FIG. 4a, the sensing electrode signal wire group LG includes at least one first sub-signal wire group SLG1 and at least one second sub-signal wire, group SLG2 which are arranged within a region covered by the sensing electrodes SA. The first sub-signal wire group SLG1 has N sensing electrode signal wires L, and the second sub-signal wire group SLG2 has N+1 sensing electrode signal wires L, in which N is a positive integer. The first sub-signal wire group SLG1 and the second sub-signal wire group SLG2 are electrically connected to the connecting channels of the touch sensing circuit ICD to enable the touch sensing circuit ICD to process the touch sensing signal advantageously.

Figure 5B:
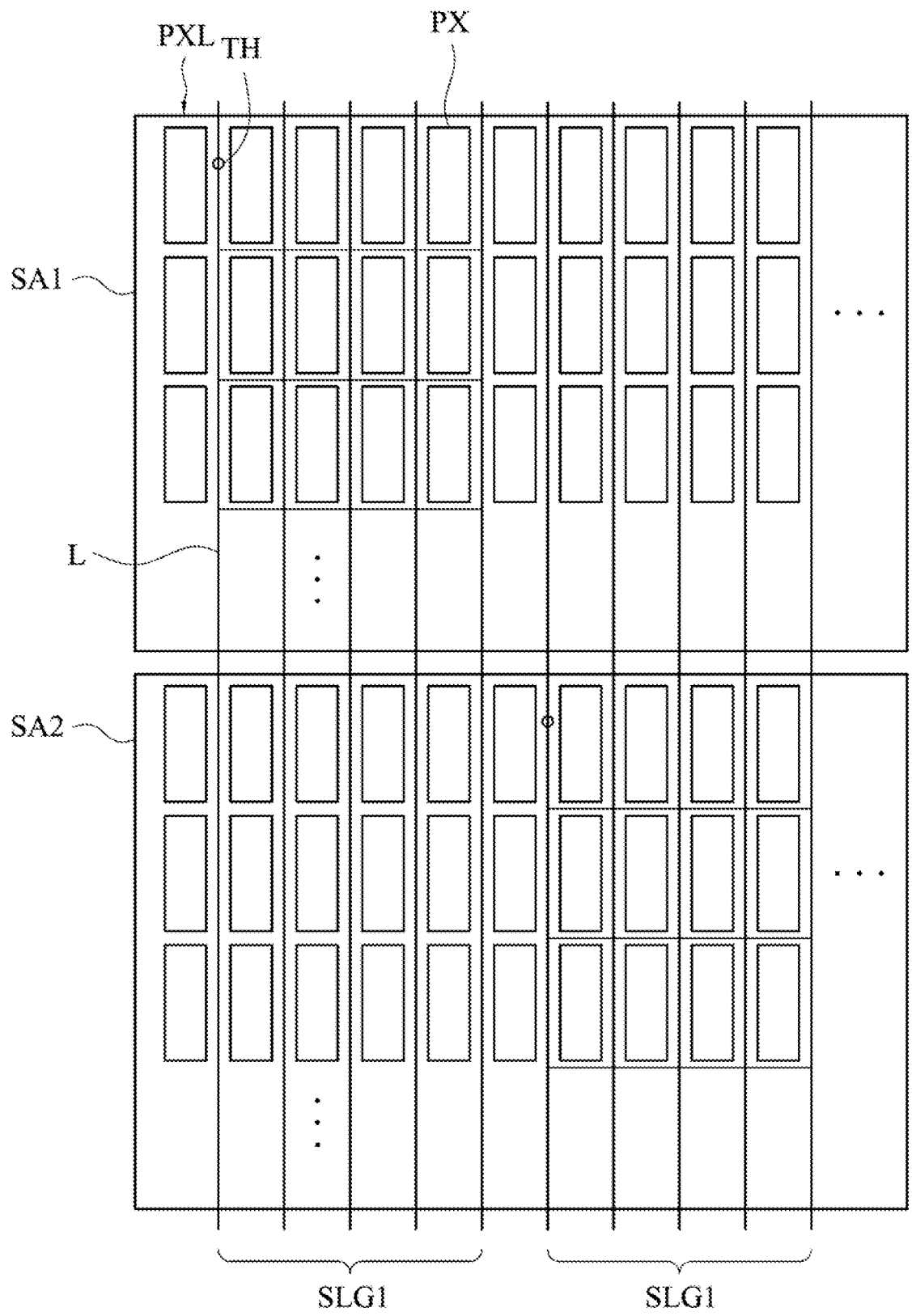

As shown in FIG. 5a, in this embodiment, the sensing electrodes SA are electrically connected to the sensing electrode signal wire groups LG through contact holes TH. For example, the first sensing electrode SA1 is electrically connected to the sensing electrode signal wires L of the first sub-signal wire group SLG1 through 5 contact holes. In addition, each of the first/second sub-signal wire groups SLG1/SLG2 is only electrically connected to one sensing electrode SA. For example, the second sensing electrode SA2 is electrically connected to another first sub-signal wire group SLG1, the second sub-signal wire group SLG2 is electrically connected to a third sensing electrode SA3. In the present invention, a number of the aforementioned contact holes TH used to connect to corresponding sub-signal wire group SLG is not limited to 5. The number of the contact holes TH may be 1, 2, 3 4, 5, or 6. This is, whether 5, 6, or other numbers of the sensing electrode signal wires L is included by in the sub-signal wire group, the arrangement of the sensing electrode signal wires L is acceptable while at least one sensing electrode signal wire L is electrically connected to one corresponding sensing electrode SA through one contact holes TH, as shown in FIG. 5b. As shown in the second sensing electrode SA2, the sensing electrode signal wires L of the first sub-signal wire groups SLG1 are laterally electrically connected to each other, and thus the number of the contact holes TH is selectable.

Figure 4B:
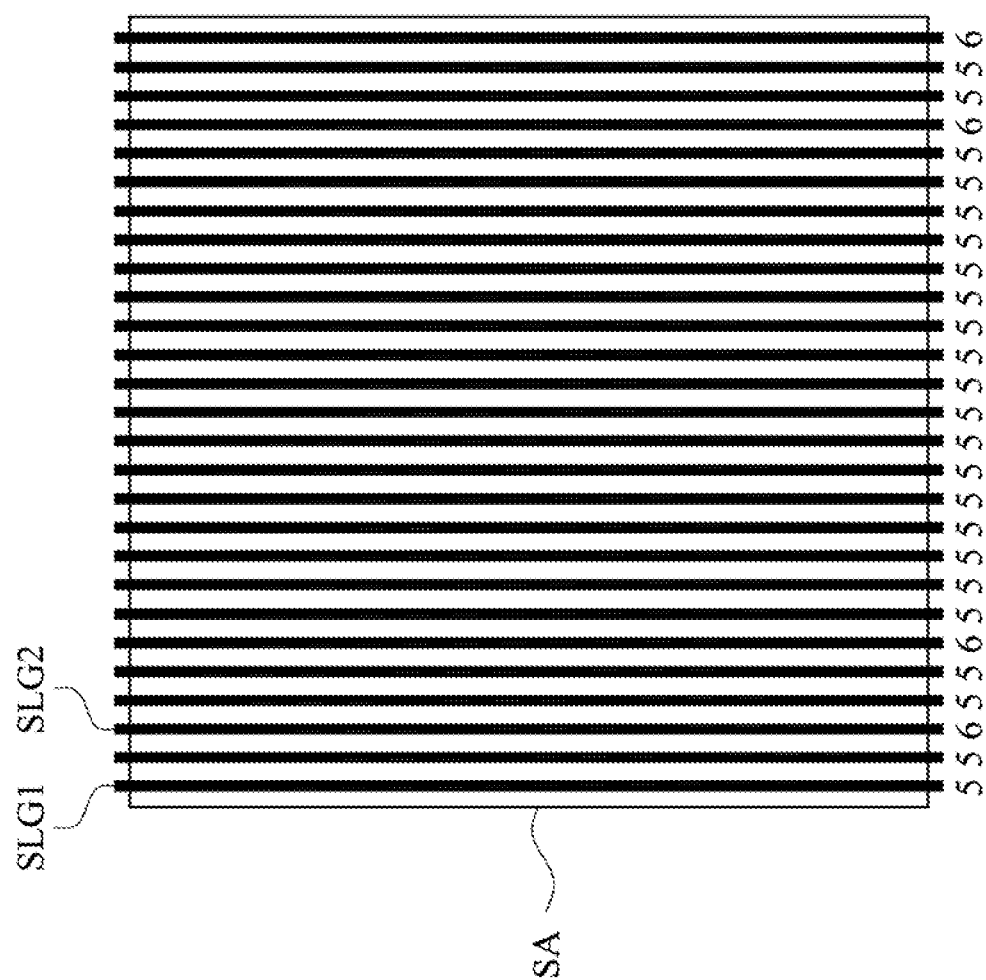

It can be understood from the above description that the sensing electrode signal wires L of the present invention are distributed within the covering region of the corresponding sensing electrode SA in a substantially uniform manner, such that the capacitive touch display panel 100 has substantially uniform loads of signal lines and substantially uniform optical characteristics (such as aperture ratio). For example, in this embodiment, a sensing electrode column SAL includes 27 sensing electrodes SA, the dimension of each of the sensing electrodes SA is 4.54 mm×4.48 mm, and each of the sensing electrodes SA corresponds to 144× 47=6768 sub-pixels PX. In this embodiment, the color of these sub-pixels PX includes red, blue, or green, but embodiments of the present invention are not limited thereto. For example, the aforementioned colors may include white, yellow, or orange. These sub-pixels PX constitute the 144 pixel columns PXL, and each of the pixel columns PXL corresponds to one of the sensing electrode signal wires L, as shown in FIG. 4a and FIG. 5a. Because 144 cannot be divisible by 27, therefore the number of the sensing electrode signal wires L electrically connected to each of the sensing electrodes SA cannot be the same. Therefore, in this embodiment of the present invention, the 144 sensing electrode signal wires L are divided into the first sub-signal wire group SLG1 and the second sub-signal wire group SLG2, in which the number of the sensing electrode signal wires L of the first sub-signal wire group SLG1 is 5, and the number of the sensing electrode signal wires L of the second sub-signal wire group SLG2 is 6. Thereafter, the first sub-signal wire group SLG1 and the second sub-signal wire group SLG2 are arranged in a substantially uniform manner. As shown in FIG. 4a, the first sub-signal wire group SLG1 and the second sub-signal wire group SLG2 are arranged in a set (5 sensing electrode signal wires, 5 sensing electrode signal wires, 6 sensing electrode signal wires) and the set is repeatedly arranged to achieve an arrangement of 144 sensing electrode signal wires L. In another embodiment of the present invention (as shown in FIG. 4b), the first sub-signal wire group SLG1 and the second sub-signal wire group SLG2 are arranged in a first set (5 sensing electrode signal wires, 5 sensing electrode signal wires, 6 sensing electrode signal wires) and a second set (5 sensing electrode signal wires, 5 sensing electrode signal wires, 5 sensing electrode signal wires). The first set is repeatedly arranged to obtain 2 sets of sensing electrode signal wires, and the second set is sequentially repeatedly arranged to obtain 6 sets of sensing electrode signal wires, and the first set is sequentially repeatedly arranged to obtain 2 sets of sensing electrode signal wires, thereby achieving a wire arrangement of 154 sensing electrode signal wires. By the aforementioned arrangement of sensing electrode signal wires L, the whole load of the active region and the optical characteristics of the capacitive touch display panel 100 are substantially uniform, and thus prevent generation of strip patterns on the screen.

It can be understood from the above example that the total number and the arrangement of the first sub-signal wire group SLG1 and corresponding second sub-signal group SLG2 changed according to the number and dimension of the sensing electrodes SA. In principle, the difference between the second sub-signal wire group SLG2 and the first sub-signal wire group SLG1 is in that the second sub-signal wire group SLG2 has one more sensing electrode signal wire L.

Figure 6A:
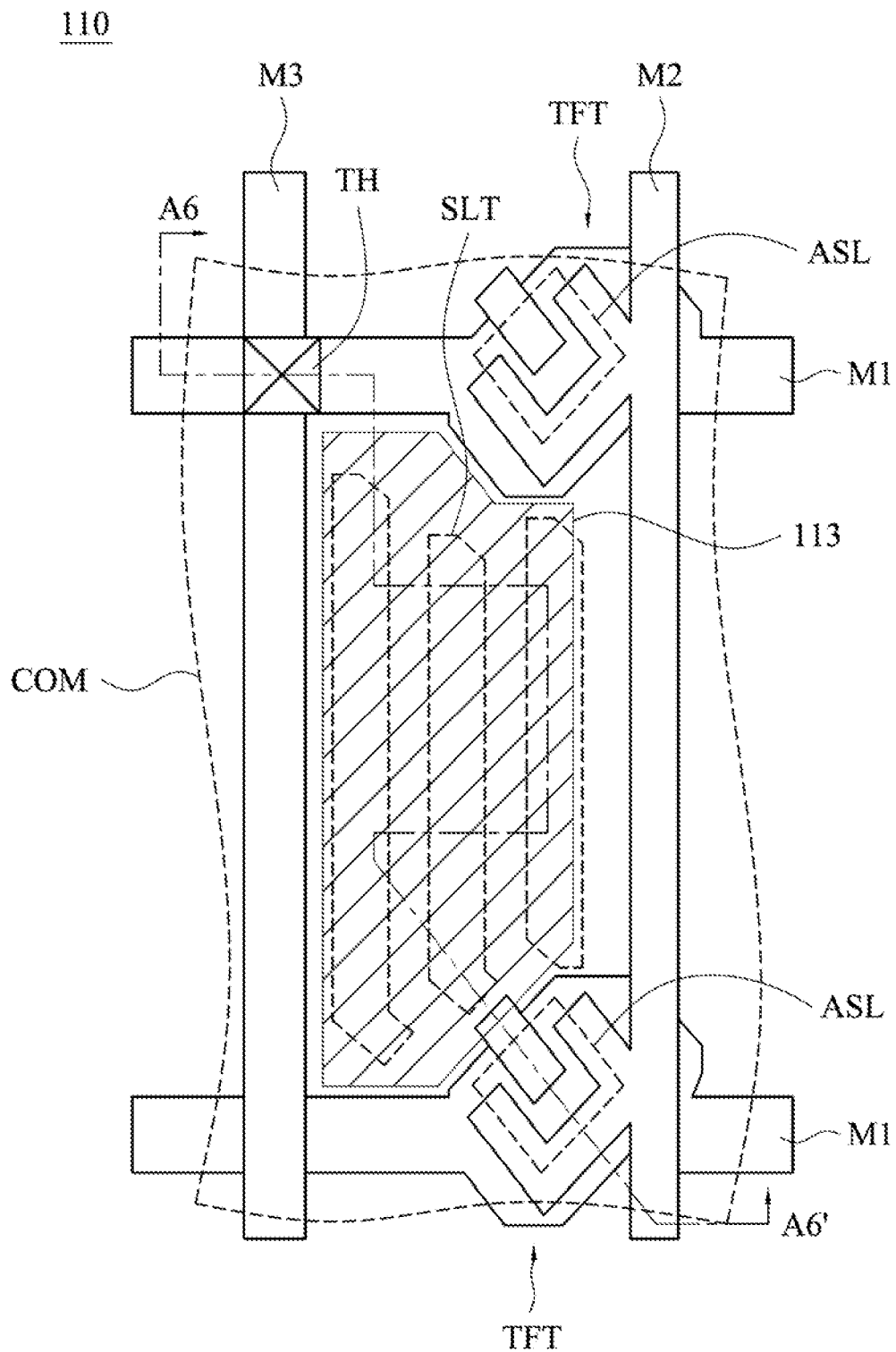
FIG. 6*a* is a top view of the structure of the thin film transistor array substrate according to an embodiment of the present invention.
Figure 6B:
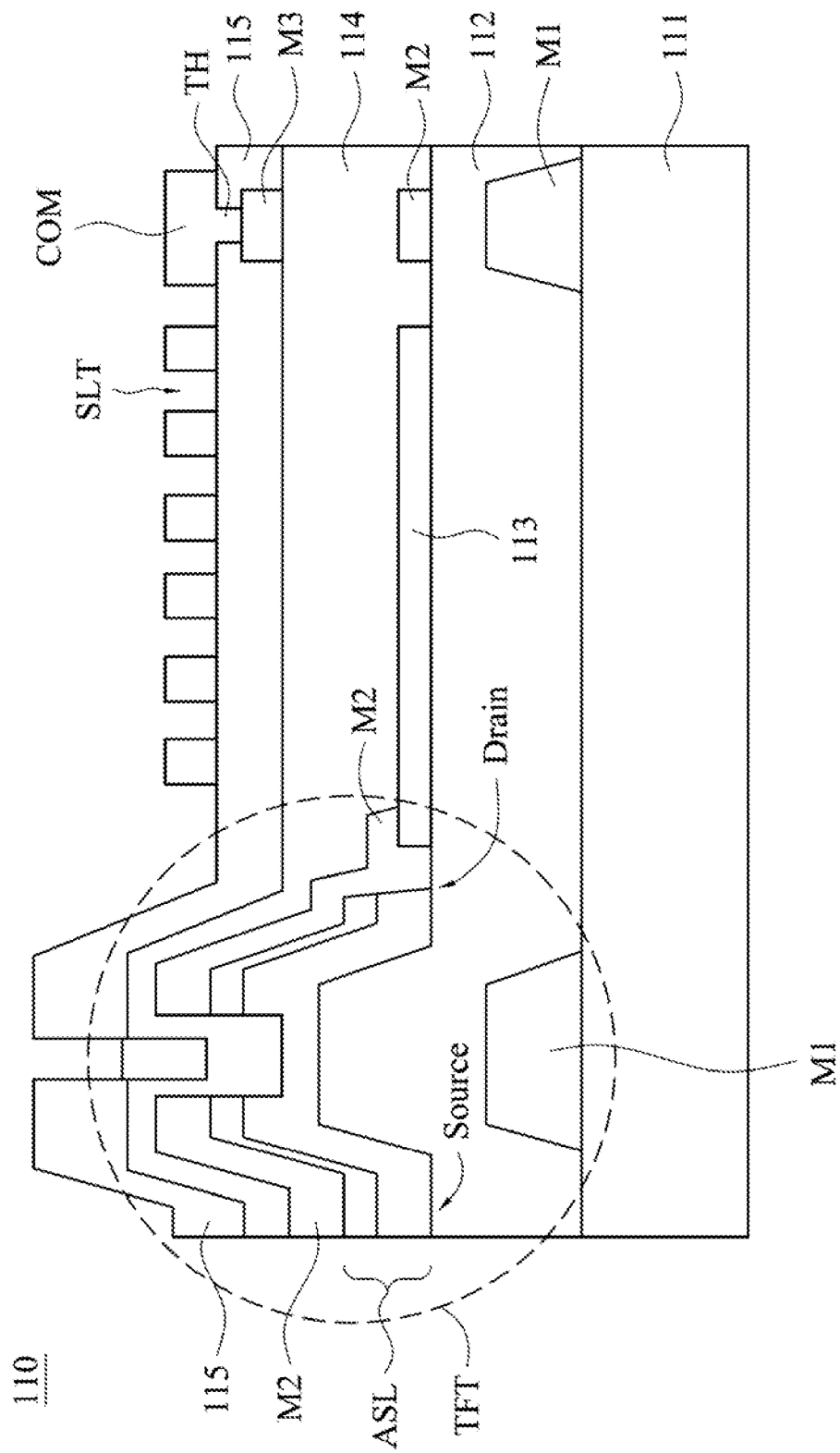
FIG. 6*b* is a cross-sectional view along a cut line A6-A6' in FIG. 6*a*.

Referring to FIG. 6a and FIG. 6b, FIG. 6a is a top view of the structure of the thin film transistor array substrate 110 according to an embodiment of the present invention, FIG. 6b is a cross-sectional view along a cut line A6-A6' in FIG. 6a, in which the structure illustrated in FIG. 6a corresponds to a sub-pixel PX. For convenience of explanation, a portion of layers of the thin film transistor array substrate 110 is not drawn in FIG. 6a. For a sub-pixel PX, the thin film transistor array substrate 110 includes substrate 111, the first patterned metal layer M1, the first patterned insulating layer 112, the patterned semiconductor layer ASL, the second patterned metal layer M2, the pixel electrode 113, the second patterned insulating layer 114, the third patterned metal layer M3, the third patterned insulating layer 115, and the patterned common electrode layer COM.

The first patterned metal layer M1 is located on the substrate 111 to provide the signal lines and gates, in which the signal lines include the scan lines of the thin film transistor array substrate 110. The first patterned insulating layer 112 and the patterned semiconductor layer ASL are sequentially located on the first patterned metal layer M1 to form the thin film transistor TFT. The second patterned metal layer M2 is located on the patterned semiconductor layer ASL to form the data lines (the second patterned metal layer M2 shown in FIG. 6a and FIG. 6b), the sources, and the drains of the thin film transistor array substrate 110. The pixel electrode 113 is located on the first patterned insulating layer 112 and electrically connected to one of the data lines through a thin film transistor TFT in a display region (not shown). It is noted that the first patterned insulating layer 112 are disposed in the display area and a non-display area, wherein the non-display area may include some components of the thin film transistor TFT or the bonding pads (not shown). As shown in FIG. 6b, first the pixel electrode 113 is formed, and then the second patterned metal layer M2 is formed, and thus the drains of the second patterned metal layer M2 contact and cover a portion of the pixel electrode 113 to be electrically connected to each other. However, in another embodiment of the present invention, the second patterned metal layer M2 is formed at first, and then the pixel electrode 113 is formed, and thus the pixel electrode 113 directly contacts the drain of the second patterned metal layer M2 or is electrically connected to a portion of the drain of the second patterned metal layer M2 (not shown) through the contact holes. The second patterned insulating layer 114 is located on the patterned semiconductor layer ASL, the pixel electrode 113, and the second patterned metal layer M2 to provide a function of electrical isolation. The third patterned metal layer M3 is located on the second patterned insulating layer 114 to form plural sensing electrode signal wires L (the sensing electrode signal wire group LG). The third patterned insulating layer 115 is located on the third patterned metal later M3 to provide a function of electrical isolation. The patterned common electrode layer COM is located on the third patterned insulating layer 115 to form plural sensing electrodes SA (also refer to FIG. 4a), and electrically connected to the sensing electrode signal wire group LG (also refer to FIG. 5a) formed by the third patterned metal layer M3 through the contact holes TH penetrating the third patterned insulating layer 115. As shown in FIG. 6b, at least one of the sensing electrodes SA formed by the patterned common electrode layer COM overlaps one of the corresponding sensing electrode signal wire groups LG formed by the third patterned metal layer M3 in the direction perpendicular to the substrate 111. In this embodiment, the patterned common electrode layer COM has slit structures SLT corresponding to the pixel electrode 113. However, embodiments of the present invention are not limited thereto. The pixel electrode 113 may have slit structures SLT (not shown).

In this embodiment, the sensing electrode signal wire group LG is formed by using the third patterned metal layer M3 sandwiched between the second patterned insulating layer 114 and the third patterned insulating layer 115. Therefore, the sensing electrode signal wire group LG may obtain preferred protection.

It is noted that, in this embodiment, the sub-pixel PX includes the first patterned metal layer M1, the first patterned insulating layer 112, the patterned semiconductor layer ASL, the second patterned metal layer M2, the pixel electrode 113 and the second patterned insulating layer 114. However, embodiments of the present invention are not limited thereto.

Figure 7A:
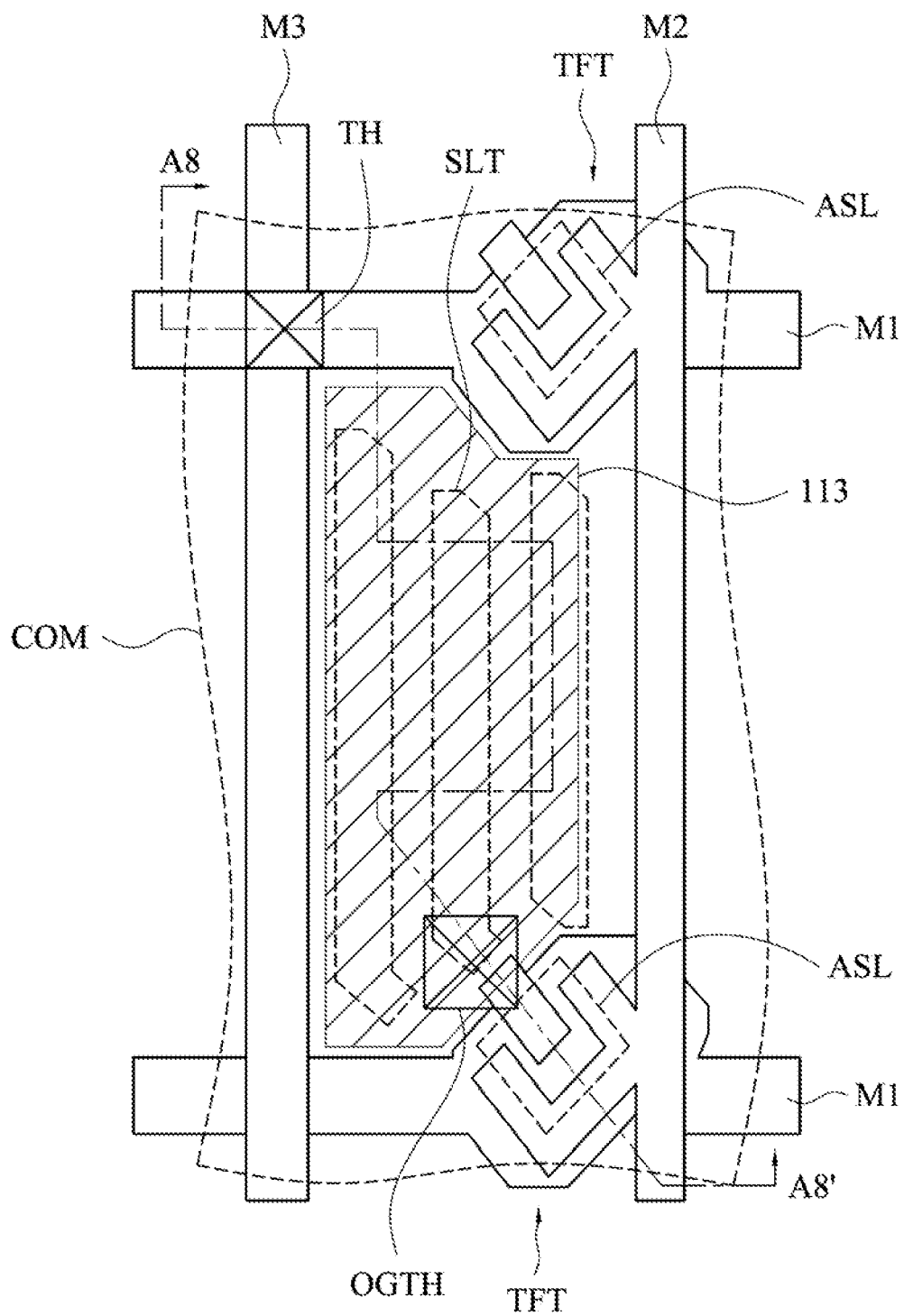
FIG. 7*a* is a top view of the structure of a thin film transistor array substrate according to an embodiment of the present invention.
Figure 7B:
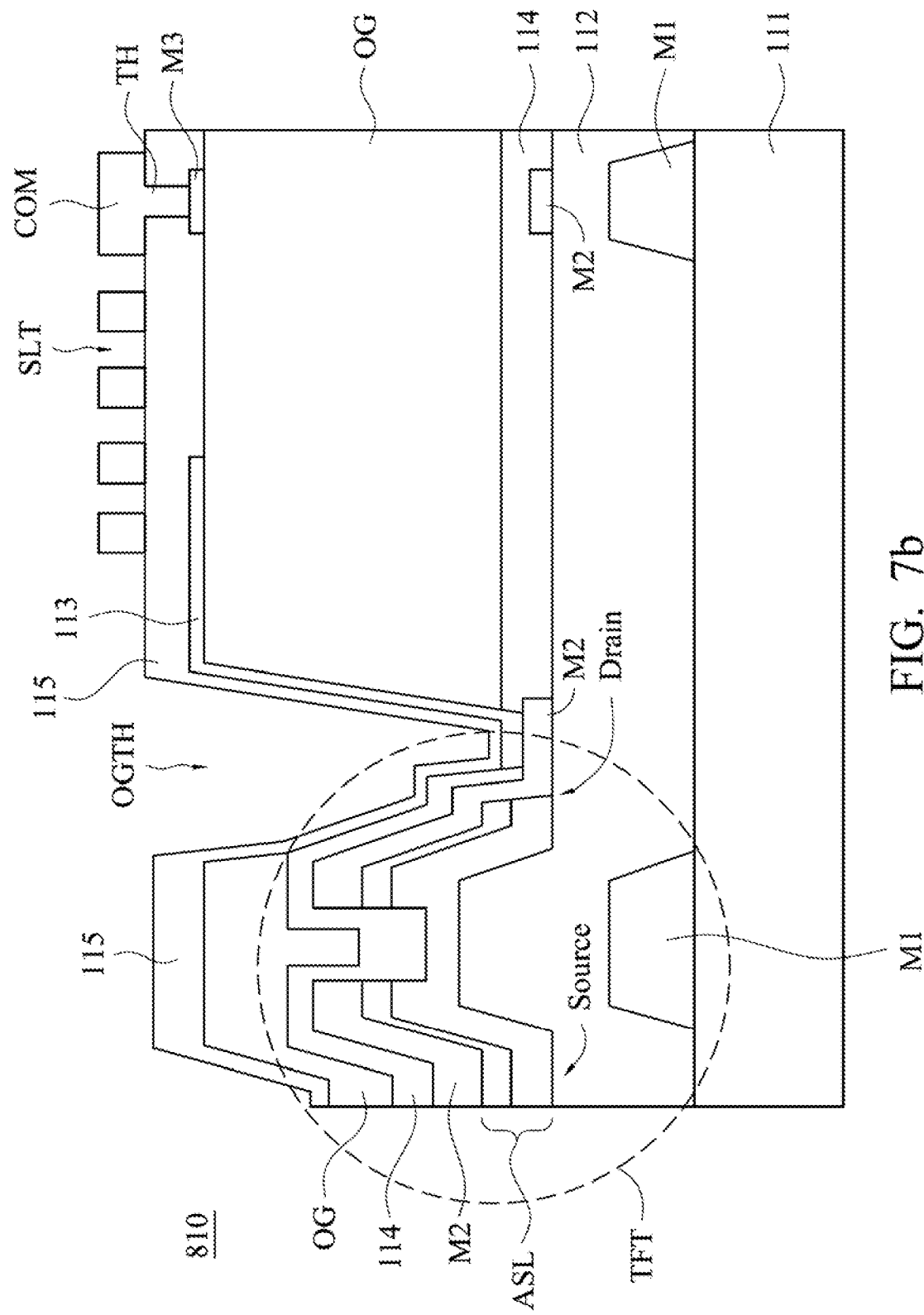
FIG. 7*b* is a cross-sectional view along a cut line A8-A8' in FIG. 7*a*.

Referring to FIG. 7a and FIG. 7b, FIG. 7a is a top view f the structure of a thin film transistor array substrate 810 according to an embodiment of the present invention, FIG. 7b is a cross-sectional view along a cut line A8-A8' in FIG. 7a, in which the structure illustrated in FIG. 7a corresponds to one sub-pixel PX. The thin film transistor array substrate 810 of this embodiment is similar to the thin film transistor array substrate 110, but the difference is that the thin film transistor array substrate 810 further includes a planarized insulating layer OG, for example, an organic photoresist layer. The thin film transistor array substrate 810 additionally includes plural contact holes OGTH. The contact holes OGTH pass through the planarized insulating layer OG and the second patterned insulating layer 114 to allow the pixel electrode 113 to be electrically connected to the drain of the thin film transistor TFT through the contact holes OGTH. The planarized insulating layer OG can elevate the pixel electrode 113 and the patterned common electrode layer COM to increase the aperture ratio of the sub-pixel PX.

In this embodiment, the planarized insulating layer OG is located between the second patterned insulating layer 114 and the third patterned insulating layer 115, and the third patterned metal layer M3 is located between the planarized insulating layer OG and the third patterned insulating layer 115, thereby improving the problem of signal coupling between the third patterned metal layer M3 (the sensing electrode signal wire L) and another layer. For example, a problem of signal interference occurs between the third patterned metal layer M3 and the data line (M2) can be improved. As shown in FIG. 7b, at least one of the sensing electrodes SA formed by the patterned common electrode layer COM overlaps one of the corresponding sensing electrode signal wire groups LG formed by the third patterned metal layer M3 in the direction perpendicular to the substrate 111. In present embodiment, the patterned common electrode layer COM has slit structures SLT corresponding to the pixel electrode 113. However, embodiments of the present invention are not limited thereto. The pixel electrode 113 may have slit structures SLT (not shown).

Figure 8:
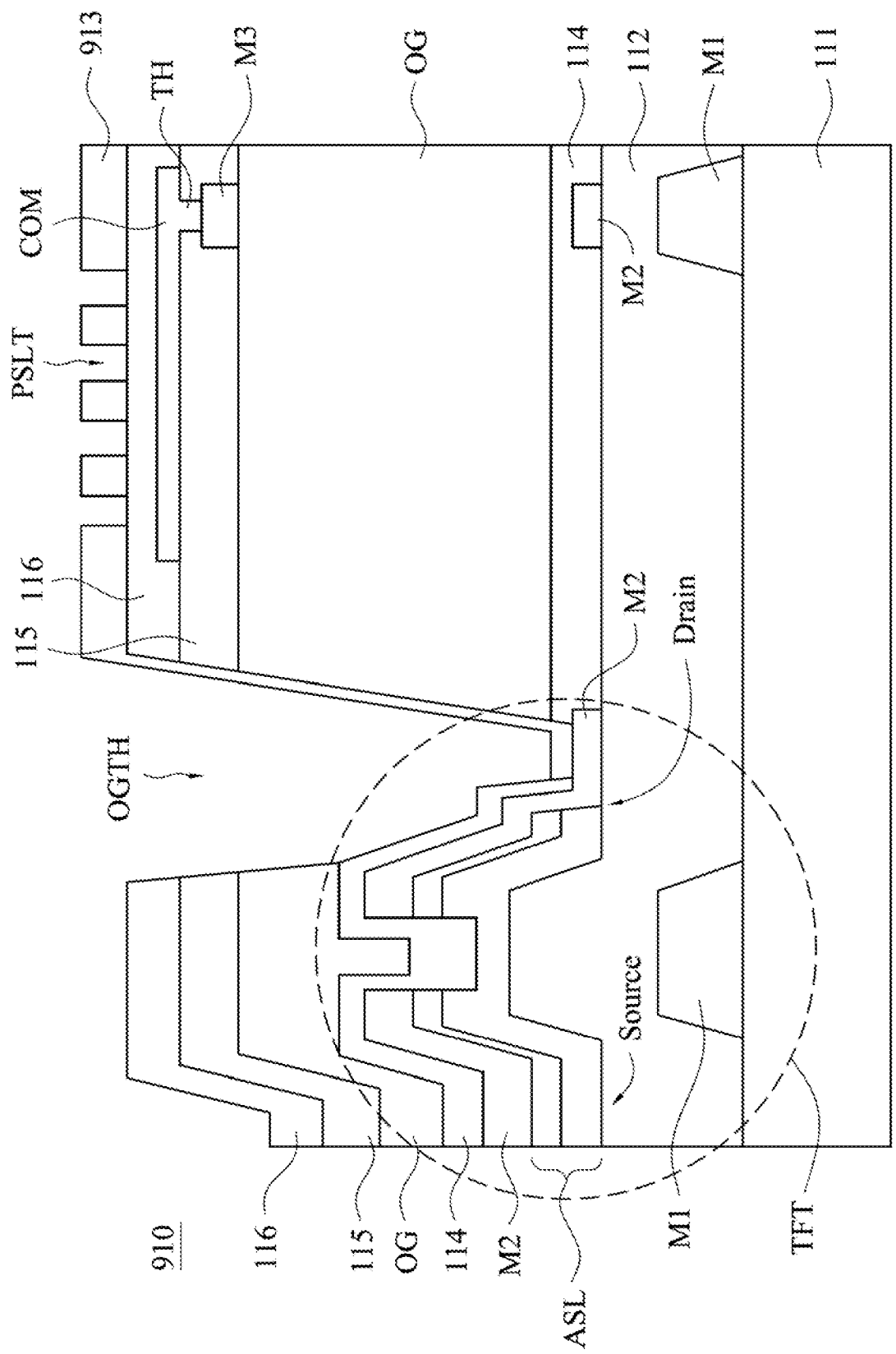
FIG. 8 is a schematic cross-sectional view of a structure of a thin film transistor array substrate according to an embodiment of the present invention.

Referring to FIG. 8, FIG. 8 is a schematic cross-sectional view of a structure of a thin film transistor array substrate 910 according to an embodiment of the present invention, in which the structure illustrated in FIG. 8 corresponds to one sub-pixel PX. The thin film transistor array substrate 910 of this embodiment is similar to the thin film transistor array substrate 810, but the difference is that the thin film transistor array substrate 910 further includes a fourth patterned insulating layer 116, and the locations of the pixel electrode 913 and the patterned common electrode layer COM are different. Specifically, the patterned common electrode layer COM is located between the third patterned insulating layer 115 and the fourth patterned insulating layer 116. As shown in FIG. 8, at least one of the sensing electrodes SA formed by the patterned common electrode layer COM overlaps one of the corresponding sensing electrode signal wire groups LG formed by the third patterned metal layer M3 in the direction perpendicular to the substrate 111. The pixel electrode 913 is located on the fourth patterned insulating layer 116 and has slit structures PSLT corresponding to the patterned common electrode layer COM. However, embodiments of the present invention are not limited thereto. The patterned common electrode layer COM may have slit structures SLT (not shown).

Figure 9A:
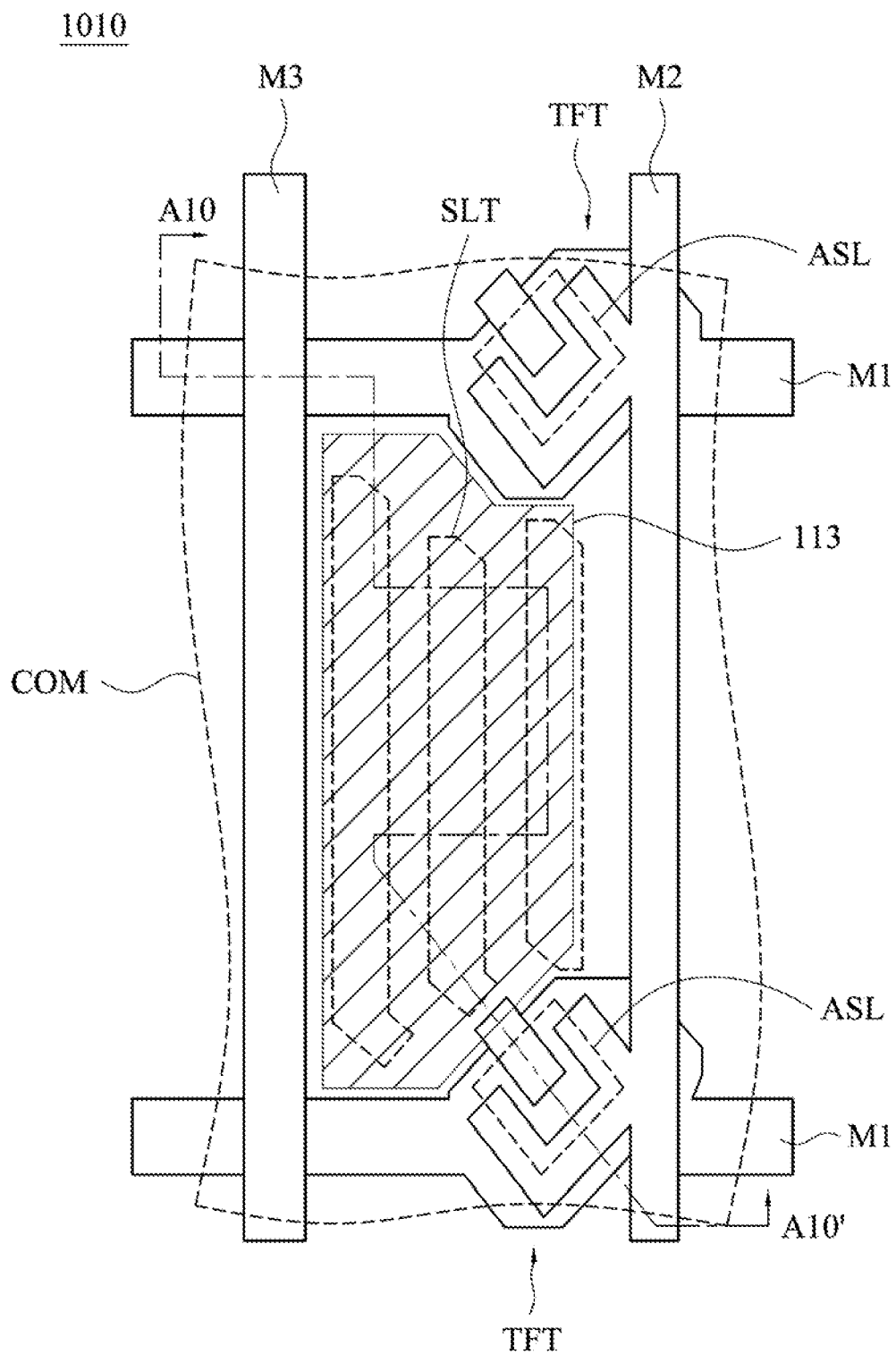
FIG. 9*a* is a top view of a structure of a thin film transistor array substrate according to an embodiment of the present invention.
Figure 9B:
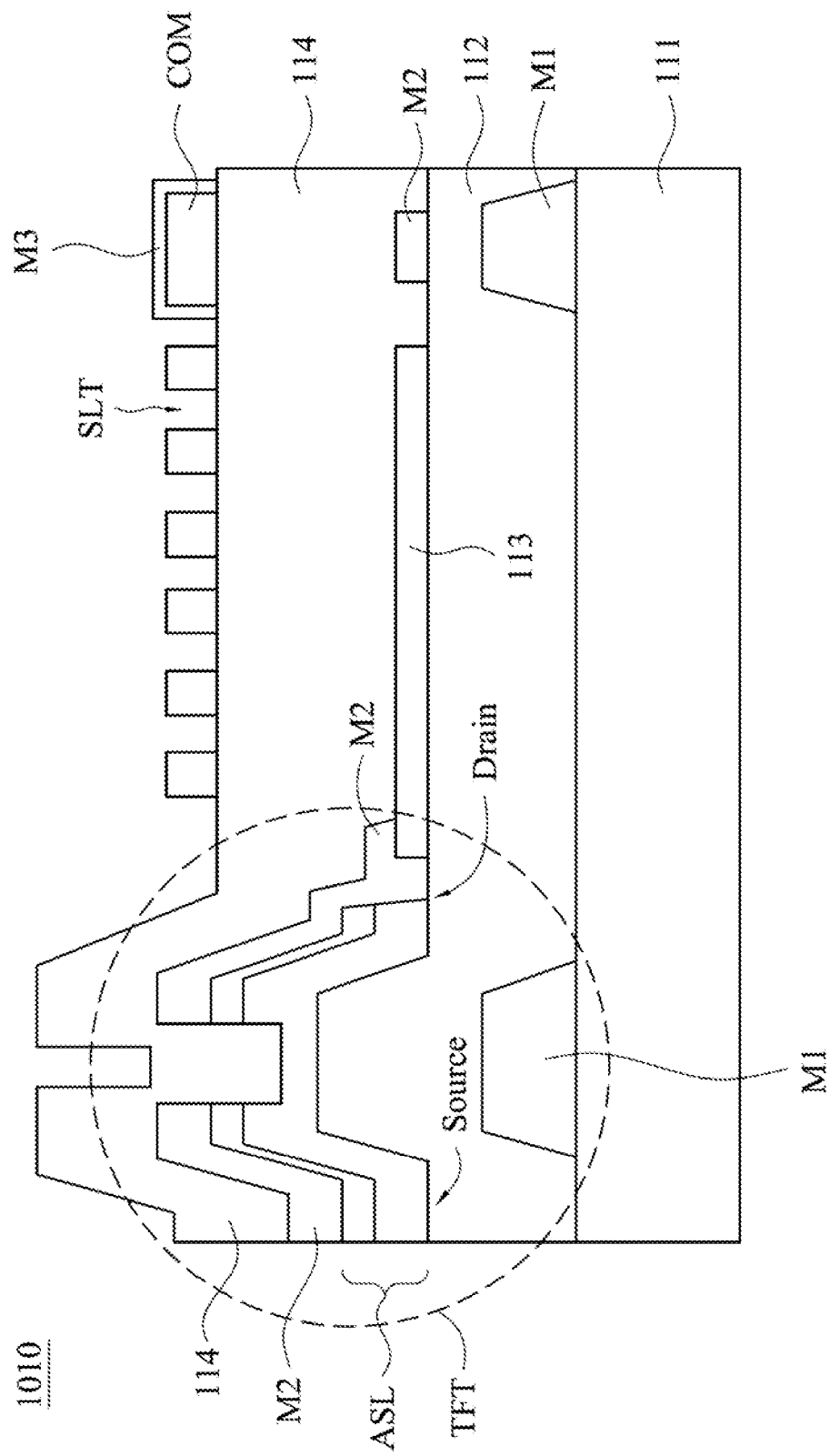
FIG. 9*b* is a cross-sectional view along a cut line A10-A10' in FIG. 9*a*.

Referring to FIG. 9a and FIG. 9b, FIG. 9a is a top view of a structure of a thin film transistor array substrate 1010 according to an embodiment of the present invention, FIG. 9b is a schematic cross-sectional view along a cut line A10-A10' in FIG. 9a, in which the structure illustrated in FIG. 9a corresponds to one sub-pixel PX. The thin film transistor array substrate 1010 of present embodiment is similar to the thin film transistor array substrate 110, and the similarities with aforementioned embodiment are not repeated. The difference is that the thin film transistor array substrate 1010 saves the third patterned insulating layer 115, and the third patterned metal layer M3 is formed on part of the patterned common electrode layer COM to be electrically connected to each other.

In this embodiment, because the thin film transistor array substrate 1010 saves the third patterned insulating layer 115, the manufacture process of the thin film transistor array substrate 1010 becomes easier and cheaper.

Figure 10A:
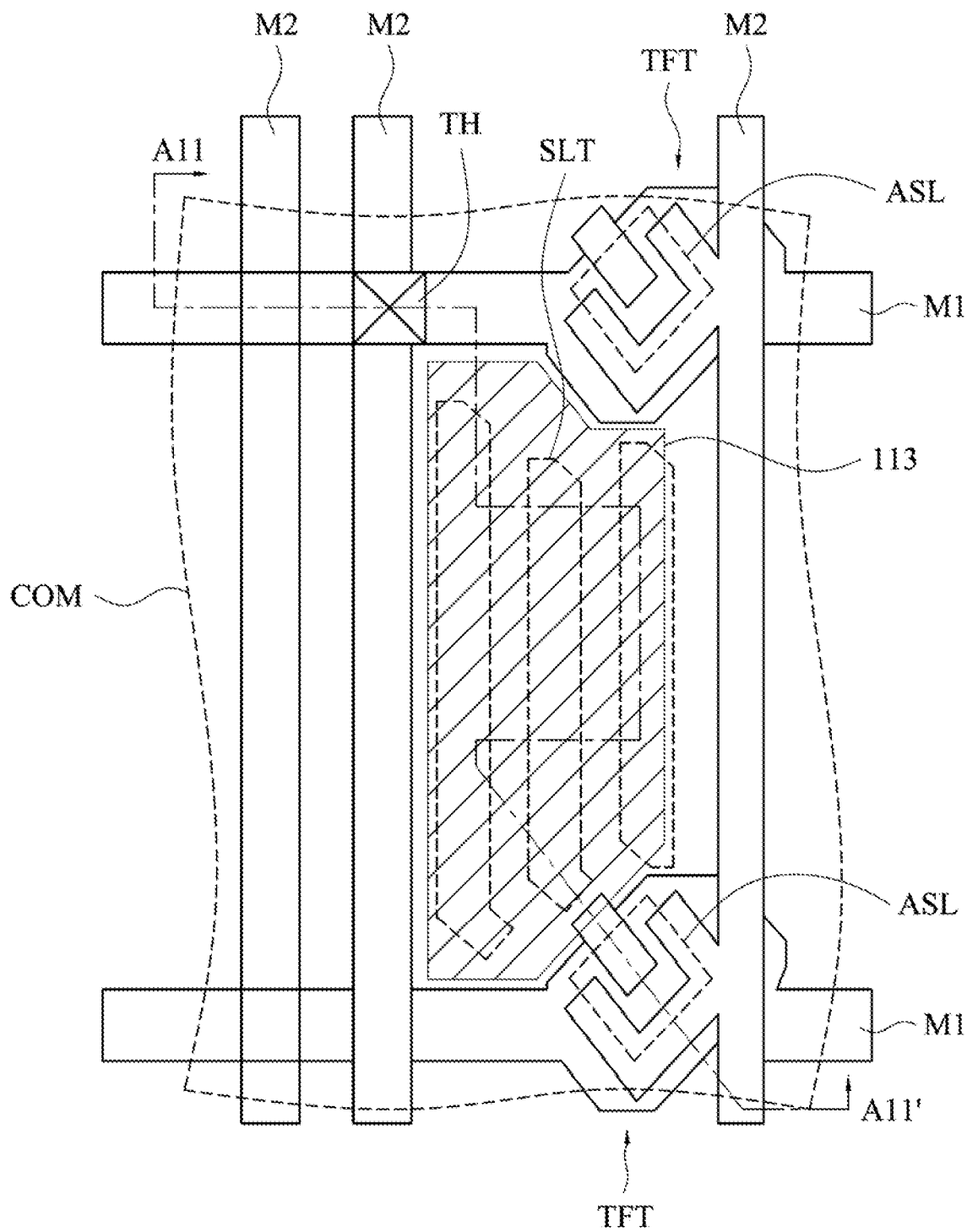
FIG. 10*a* is a top view of a structure of a thin film transistor array substrate according to an embodiment of the present invention.
Figure 10B:
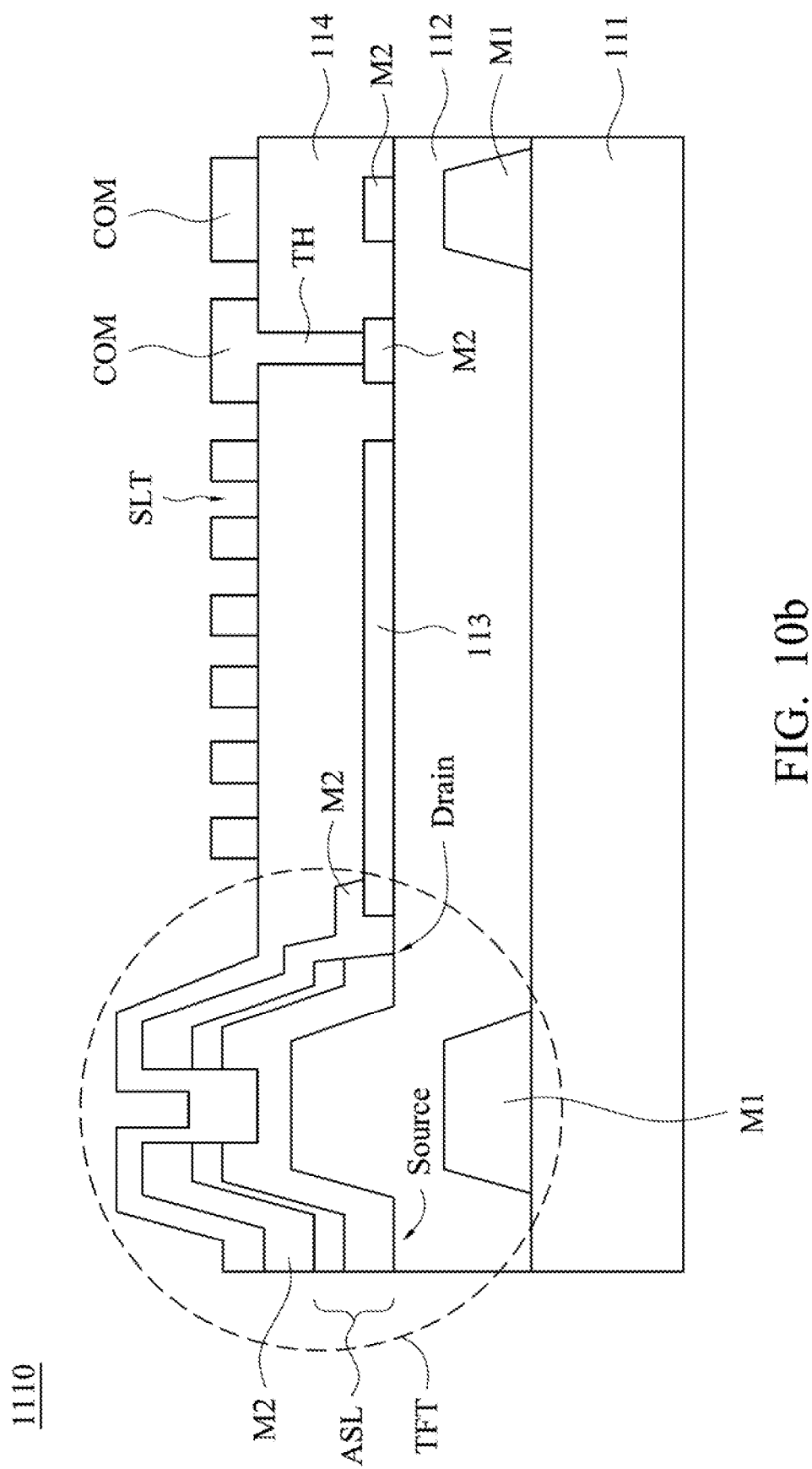
FIG. 10*b* is a cross-sectional view along a cut line A11-A11' in FIG. 10*a*.

Referring to FIG. 10a and FIG. 10b, FIG. 10a is a top view of the structure of a thin film transistor array substrate 1110 according to an embodiment of the present invention, FIG. 10b is a cross-sectional view along a cut line A11-A11' in FIG. 10a, in which the structure illustrated in FIG. 10a corresponds to one sub-pixel PX. The thin film transistor array substrate 1110 of present embodiment is similar to the thin film transistor array substrate 110, but the difference is that the thin film transistor array substrate 1110 save the third patterned insulating layer 115. The second patterned metal layer M2 is formed on the first patterned insulating layer 112 to form plural sensing electrode signal wires L (the sensing electrode signal wire group LG). The second patterned insulating layer 114 is located on the second patterned metal later M2 to provide a function of electrical isolation. The patterned common electrode layer COM is located on the second patterned insulating layer 114 to form plural sensing electrodes SA, and electrically connected to the sensing electrode signal wire group LG formed by the second patterned metal layer M2 through the contact holes TH penetrating the second patterned insulating layer 114. As shown in FIG. 10b, at least one of the sensing electrodes SA formed by the patterned common electrode layer COM overlaps one of the corresponding sensing electrode signal wire groups LG formed by the second patterned metal layer M2 in the direction perpendicular to the substrate 111. In this embodiment, the patterned common electrode layer COM has slit structures SLT corresponding to the pixel electrode 113. However, embodiments of the present invention are not limited thereto. The pixel electrode 113 may have slit structures SLT (not shown).

In this embodiment, the sensing electrode signal wire group LG is formed by using the second patterned metal layer M2 sandwiched between the first patterned insulating layer 112 and the second patterned insulating layer 114. Therefore, the sensing electrode signal wire group LG may obtain preferred protection.

In this embodiment, because the thin film transistor array substrate 1110 save the third patterned insulating layer 115, the manufacture process of the thin film transistor array substrate 1110 becomes easier and cheaper.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims.

What is claimed is:

1. A capacitive touch display panel, comprising:
  a plurality of sensing electrode columns, wherein each of the sensing electrode columns includes a plurality of sensing electrodes; and
  a plurality of sensing electrode signal wire groups electrically connected to the sensing electrode columns, wherein each of the sensing electrode signal wire groups consists of at least one first sub-signal wire group and at least one second sub-signal wire group, wherein the first sub-signal wire group includes N sensing electrode signal wires, and the second sub-signal wire group includes N+1 sensing electrode signal wires, N is a positive integer, wherein the first sub-signal wire group is only electrically connected to one of the sensing electrodes and the second sub-signal wire group is only electrically connected to another of the sensing electrodes.

2. The capacitive touch display panel of claim 1, further comprising a touch sensing circuit, wherein the touch sensing circuit is electrically connected to each of the sensing electrode columns through each of the corresponding sensing electrode signal wire groups.

3. The capacitive touch display panel of claim 2, wherein one of the sensing electrodes is electrically connected to the first sub-signal wire group and/or the second sub-signal wire group.

4. The capacitive touch display panel of claim 1, further comprising a plurality of sub-pixels, wherein each of the sensing electrodes is electrically connected to at least one of the N sensing electrode signal wires of the first sub-signal wire group and/or electrically connected to at least one of the N+1 sensing electrode signal wires of the second sub-signal wire group, and each of the sensing electrodes corresponds to multiple ones of the sub-pixels.

5. The capacitive touch display panel of claim 4, wherein the sensing electrodes include an alternative function working as common electrodes.

6. The capacitive touch display panel of claim 5, wherein each of the common electrodes has at least one slit structure corresponding to a pixel electrode of one of the sub-pixels.

7. The capacitive touch display panel of claim 1, further comprising:
  a first substrate;
  a first patterned metal layer located on the first substrate to form a plurality of scan lines;
  a first patterned insulating layer located on the first substrate and the first patterned metal layer;
  a second patterned metal layer located on the first patterned insulating layer to form a plurality of data lines;
  a plurality of pixel electrodes located on the first patterned insulating layer, wherein each of the pixel electrodes is electrically connected to one of the data lines through a thin film transistor in a display region;
  a second patterned insulating layer located on the second patterned metal layer and the pixel electrodes;
  a third patterned metal layer located on the second patterned insulating layer to form the sensing electrode signal wire groups;
  a third patterned insulating layer formed on the second patterned insulating layer and the third patterned metal layer;
  a patterned common electrode layer located on the third patterned insulating layer and the third patterned metal layer to form the sensing electrodes, wherein the sensing electrodes are electrically connected to the sensing electrode signal wire groups;
  a second substrate; and
  a liquid crystal layer located between the first substrate and the second substrate.

8. The capacitive touch display panel of claim 7, wherein at least one of the sensing electrodes overlaps one of the corresponding sensing electrode signal wire groups in the direction perpendicular to the first substrate.

9. The capacitive touch display panel of claim 7, wherein the third patterned insulating layer includes a plurality of contact holes, the third patterned metal layer is electrically connected to the patterned common electrode layer through the contact holes.

10. The capacitive touch display panel of claim 7, wherein the patterned common electrode layer has at least one slit structure corresponding to one of the pixel electrodes.

11. The capacitive touch display panel of claim 1, further comprising:
  a first substrate;
  a first patterned metal layer located on the first substrate to form a plurality of scan lines;
  a first patterned insulating layer located on the first substrate and the first patterned metal layer;
  a second patterned metal layer located on the first patterned insulating layer to form a plurality of data lines;
  a second patterned insulating layer located on the second patterned metal layer and the first patterned insulating layer;
  a planarized insulating layer located on the second patterned insulating layer;
  a third patterned metal layer located on the planarized insulating layer to form the sensing electrode signal wire groups;
  a plurality of pixel electrodes located on the planarized insulating layer, wherein each of the pixel electrodes is electrically connected to one of the data lines through a thin film transistor in a display region;
  a third patterned insulating layer located on the pixel electrodes and the third patterned metal layer;
  a patterned common electrode layer located on the third patterned insulating layer and the third patterned metal layer to form the sensing electrodes, wherein the sensing electrodes are electrically connected to the sensing electrode signal wire groups;
  a second substrate; and
  a liquid crystal layer located between the first substrate and the second substrate.

12. The capacitive touch display panel of claim 11, further comprising a plurality of contact holes, wherein the contact holes penetrate the planarized insulating layer and the second patterned insulating layer, and the pixel electrodes are electrically connected to a plurality of drains through the contact holes.

13. The capacitive touch display panel of claim 11, wherein at least one of the sensing electrodes overlaps one of the corresponding sensing electrode signal wire groups in the direction perpendicular to the first substrate.

14. The capacitive touch display panel of claim 11, wherein the patterned common electrode layer has at least one slit structure corresponding to one of the pixel electrodes.

15. The capacitive touch display panel of claim 1, further comprising:
   a first substrate;
   a first patterned metal layer located on the first substrate to form a plurality of scan lines;
   a first patterned insulating layer located on the first substrate and the first patterned metal layer;
   a second patterned metal layer located on the first patterned insulating layer to form a plurality of data lines;
   a second patterned insulating layer located on the second patterned metal layer and the first patterned insulating layer;
   a planarized insulating layer located on the second patterned insulating layer;
   a third patterned metal layer located on the planarized insulating layer to form the sensing electrode signal wire groups;
   a third patterned insulating layer located on the third patterned metal layer and the planarized insulating layer;
   a patterned common electrode layer located on the third patterned insulating layer and the third patterned metal layer to form the sensing electrodes, wherein the sensing electrodes are electrically connected to the sensing electrode signal wire groups;
   a fourth patterned insulating layer located on the patterned common electrode layer and the third patterned insulating layer;
   a plurality of pixel electrodes located on the fourth patterned insulating layer;
   a second substrate; and
   a liquid crystal layer located between the first substrate and the second substrate.

16. The capacitive touch display panel of claim 15, further comprising a plurality of contact holes, wherein the contact holes penetrate the planarized insulating layer, the second patterned insulating layer, the third patterned insulating layer and the fourth patterned insulating layer, and the pixel electrodes are electrically connected to a plurality of drains through the contact holes.

17. The capacitive touch display panel of claim 15, wherein at least one of the sensing electrodes overlaps one of the corresponding sensing electrode signal wire groups in the direction perpendicular to the first substrate.

18. The capacitive touch display panel of claim 15, wherein the pixel electrodes have at least one slit structure corresponding to the patterned common electrode layer.

19. The capacitive touch display panel of claim 1, further comprising:
   a first substrate;
   a first patterned metal layer located on the first substrate to form a plurality of scan lines;
   a first patterned insulating layer located on the first substrate and the first patterned metal layer;
   a second patterned metal layer located on the first patterned insulating layer to form a plurality of data lines and the sensing electrode signal wire groups;
   a plurality of pixel electrodes located on the first patterned insulating layer, wherein each of the pixel electrodes is electrically connected to one of the data lines through a thin film transistor in a display region;
   a second patterned insulating layer located on the second patterned metal layer, the pixel electrodes, and the first patterned insulating layer;
   a patterned common electrode layer located on the second patterned insulating layer and the second patterned metal layer to form the sensing electrodes, wherein the sensing electrodes are electrically connected to the sensing electrode signal wire groups through a plurality of contact holes penetrating the second patterned insulating layer;
   a second substrate; and
   a liquid crystal layer located between the first substrate and the second substrate.

20. The capacitive touch display panel of claim 19, wherein the patterned common electrode layer has at least one slit structure corresponding to one of the pixel electrodes.

* * * * *